May 10, 1938.  A. L. CHANG  2,116,694

AUTOMATIC HAND SIGNAL

Filed Aug. 20, 1935  4 Sheets-Sheet 1

Inventor
Albert Leong Chang

By *Clarence A. O'Brien*
Attorney

May 10, 1938.  A. L. CHANG  2,116,694
AUTOMATIC HAND SIGNAL
Filed Aug. 20, 1935  4 Sheets-Sheet 2
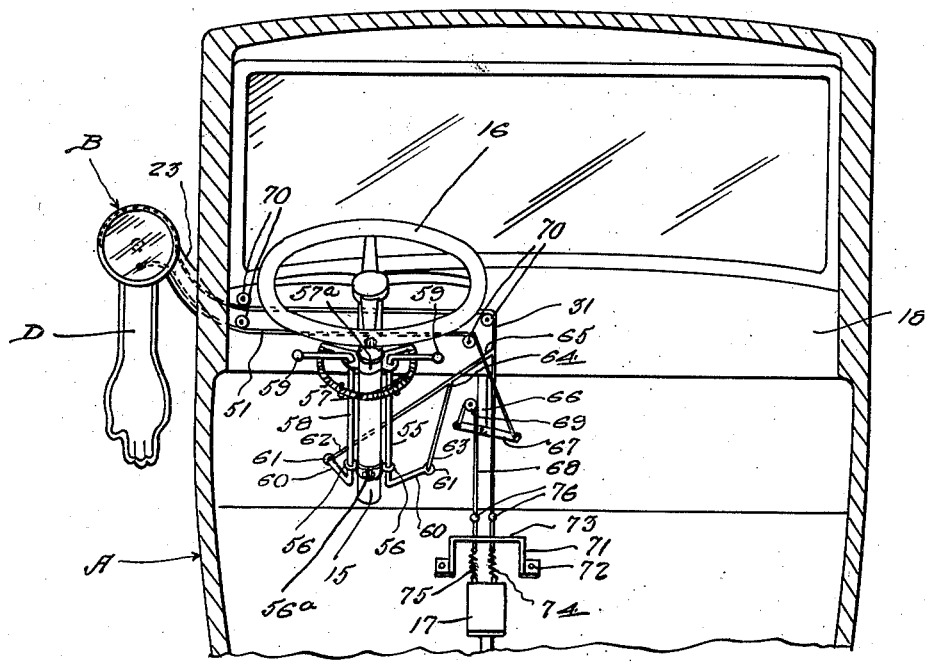
Fig. 2.
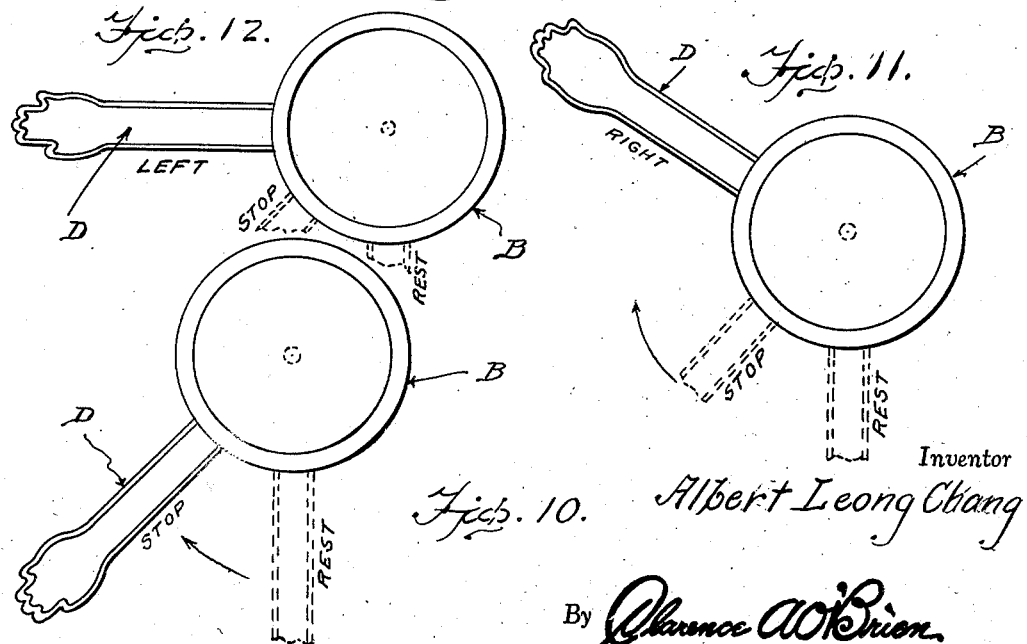
Fig. 12.  Fig. 11.
Fig. 10.
Inventor
Albert Leong Chang
By Clarence A. O'Brien
Attorney May 10, 1938.    A. L. CHANG    2,116,694
AUTOMATIC HAND SIGNAL
Filed Aug. 20, 1935    4 Sheets-Sheet 3
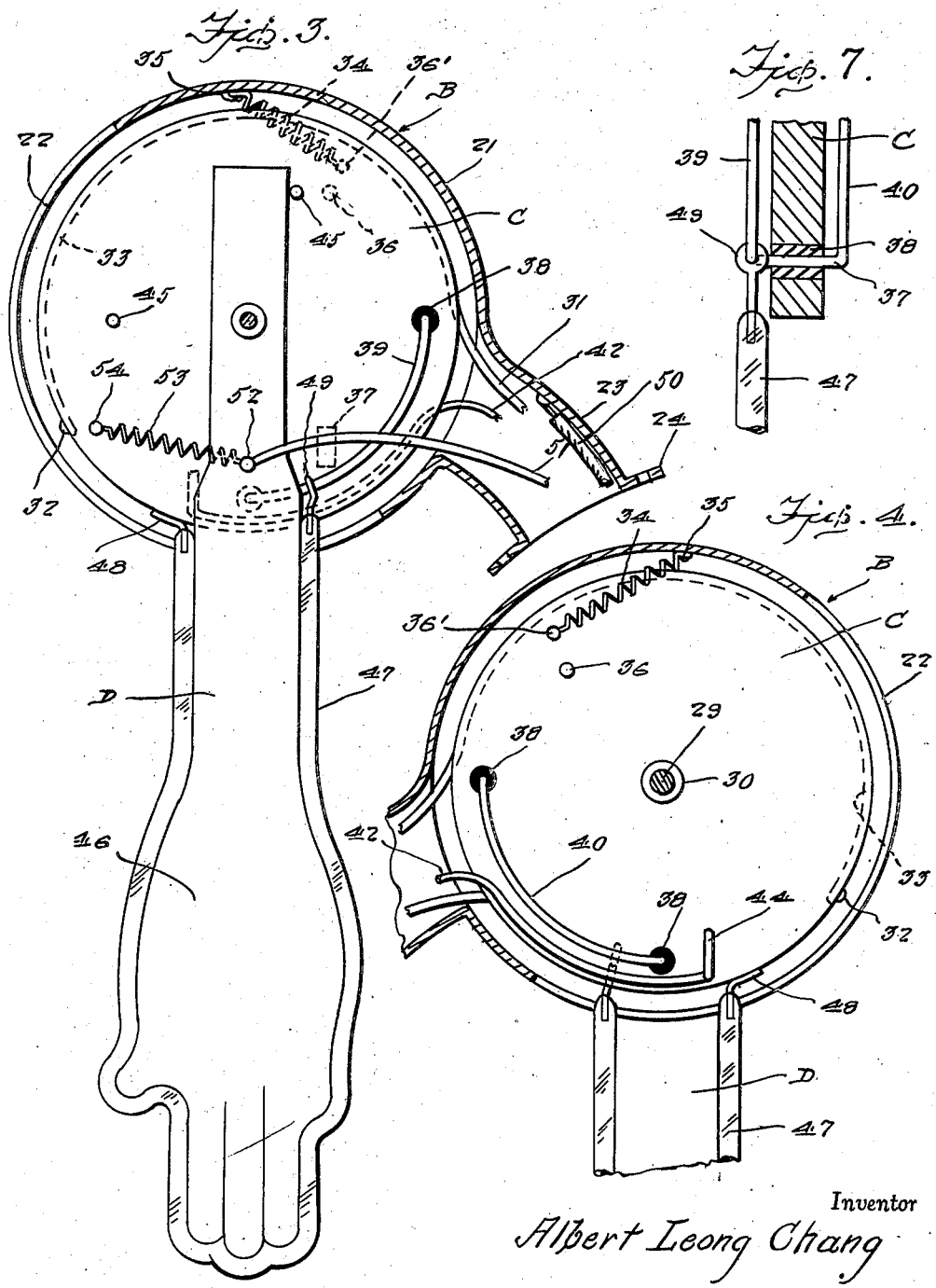
Inventor
Albert Leong Chang
By Clarence A. O'Brien
Attorney

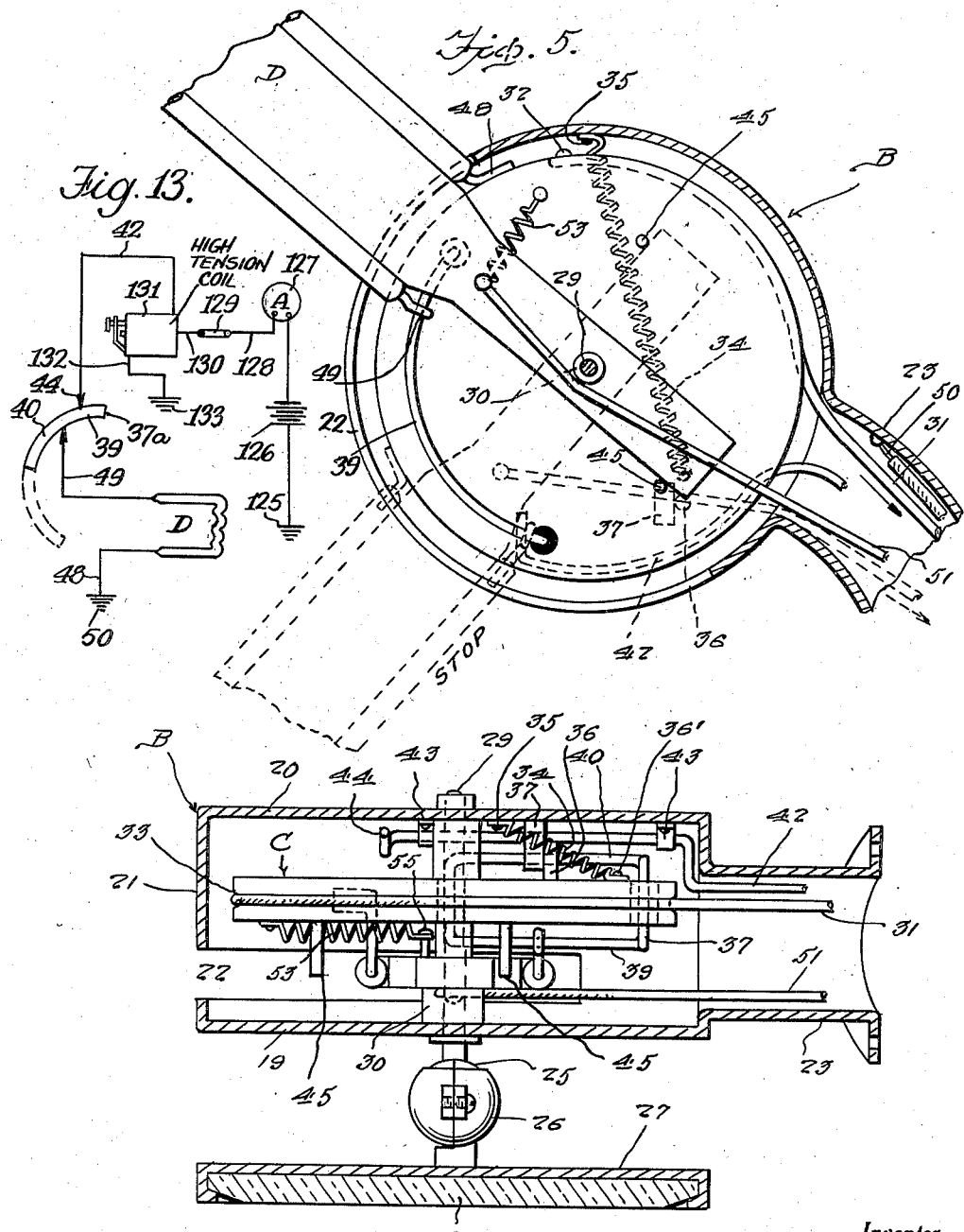

Patented May 10, 1938

2,116,694

UNITED STATES PATENT OFFICE 2,116,694

AUTOMATIC HAND SIGNAL

Albert Leong Chang, Honolulu, Territory of Hawaii

Application August 20, 1935, Serial No. 37,072

3 Claims. (Cl. 116—52)

This invention relates to an automatic hand signal particularly adapted for automobiles.

An object of the invention is to provide a signal for attachment to automobiles whereby the driver of an automobile may indicate to other automobiles his intention to make a right or left turn and to further apprise them when it is his intention to come to a stop.

Further objects of the invention are to provide a signal of the character referred to that utilizes a semaphore hand and arm simulating a human hand and arm the outline of which is illuminated by a neon tube when the semaphore is operated and that remains in de-energized or darkened condition when the signal is at rest; that is easily installed in an automobile without expensive alterations, that is very easy to operate; that is very efficient for its intended purpose and comparatively inexpensive to manufacture and install.

With the foregoing and other objects in view the invention consists of a novel construction, combination and arrangement of parts as will be hereinafter more specifically described and illustrated in the accompanying drawings wherein is disclosed an embodiment of the invention, but it is to be understood that changes, variations, and modifications may be resorted to without departing from the spirit of the claims hereunto appended.

In the drawings wherein like reference characters denote corresponding parts throughout the several views:

Figure 2 is a fragmentary vertical section through the driver's compartment of an automobile with the instrument or dash board removed and looking forwardly and showing an adaptation of the present invention with the automobile.

Figure 3 is a vertical section through the casing showing the operating parts of the signal in rear elevation and in a position at rest with the illuminating means de-energized.

Figure 4 is a vertical section through the front of the casing showing the parts in front elevation and in the rest position.

Figure 5 is a vertical section through the casing showing the parts in rear elevation and the semaphore arm in position to indicate a right turn.

Figure 6 is a diametric section through the casing showing the parts in the rest position in a top plan view.

Figure 7 is a fragmentary portion of the disk.

Figure 10 is a rear elevation of the signal showing the semaphore arm in the stop position.

Figure 11 is a view similar to Figure 10 showing the semaphore arm indicating a turn to the right.

Figure 12 is a view similar to Figure 10 showing the semaphore arm indicating a turn to the left.

Figure 13 is a diagrammatic view of the circuit for controlling the illumination of the signal.

Figure 1:
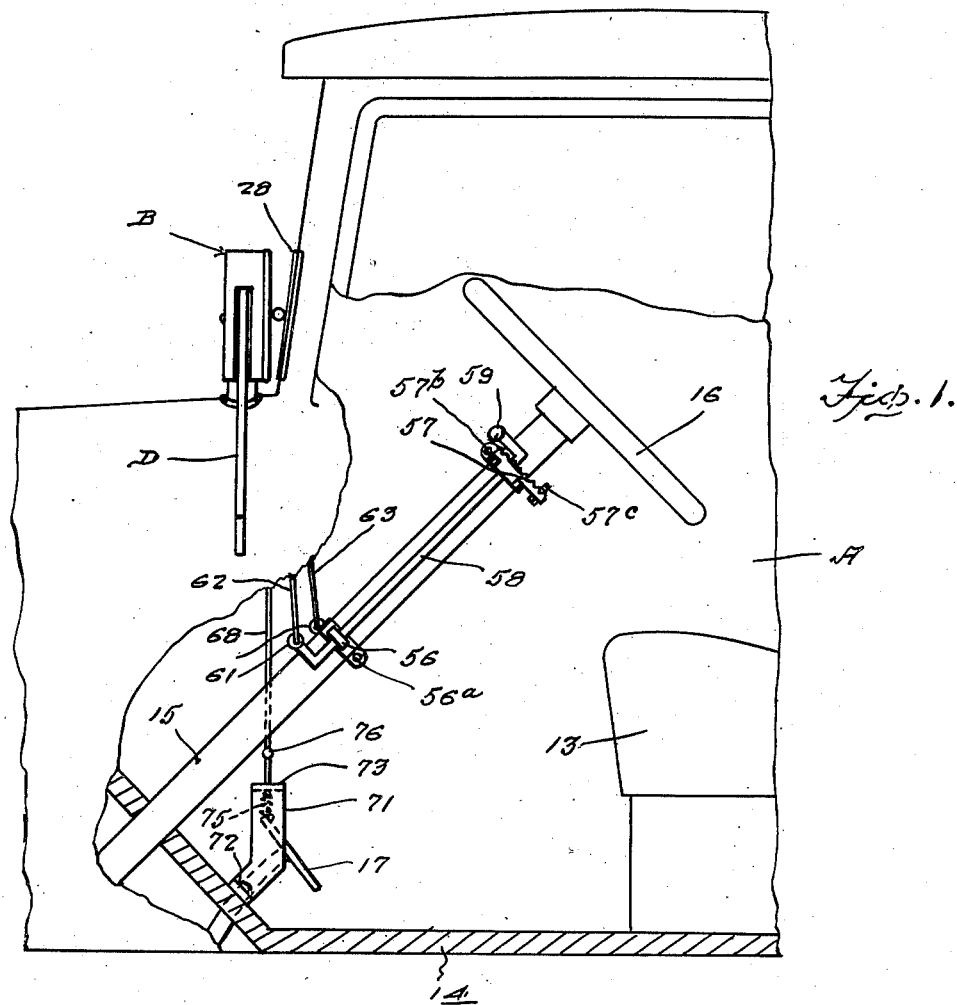
Figure 1 is a fragmentary side elevation, partly broken away, of an automobile showing an adaptation therewith of the signal in accordance with the present invention.
Figure 8:
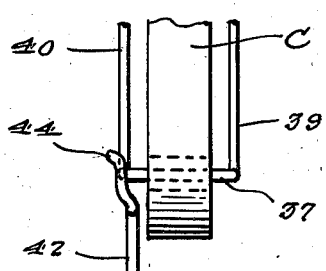
Figure 8 is an edge view of the disk showing the relation of the energizing switch to the contact frame.
Figure 9:
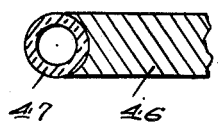
Figure 9 is a fragmentary section through the neon tube.

Referring to the drawings in detail A indicates a closed body of an automobile. In the driver's compartment of the automobile is a seat 13 and the floor boards 14. In the driver's compartment there is also the conventional steering post 15 on the upper end of which is the steering wheel 16 within reach of the driver. A conventional brake pedal is indicated at 17. In Figure 2 of the drawings, the conventional dash board is broken away so as to disclose a vertical panel 18 arranged behind the dashboard which panel forms a support for the rollers or pulleys for the operating cables as will hereafter appear.

In accordance with the present invention the signal casing indicated generally at B is mounted so as to project laterally from the body as indicated in Figure 2 of the drawings so that traffic will have an unobstructed view of the casing and semaphore arm either from the front or the rear. The signal casing B is in the form of a drum and preferably made of metal. This drum is formed with a flat rear wall 19 and a flat front wall 20. In the rim 21 of the drum is an elongated slot 22 through which extends the inner portion of the semaphore arm as will hereafter appear and the extent of this slot accommodates the movement of the semaphore arm. Extending laterally from the rim 21 of the drum casing is a neck 23 terminating in an apertured flange 24 which is bolted to the cowl of the automobile as will appear in Figure 1 of the drawings. The operating cables and conductor wire extend through the neck and there is an opening in the cowl registering with the neck to allow the cables and conductor wire to pass into the casing.

On the outside of the rear wall 19 is anchored a ball 25 which is connected to a socket 26 carried by frame 27 in which is supported a rear view mirror 28.

Inside the drum casing B is a disk C mounted for rotatable movement within certain limits on a bolt 29 which extends across the center of the casing. The ends of the bolt are secured respectively to the front and rear walls 19 and 20 of the casing. Spacing thimbles 30 mounted on the bolt 29 provide for spacing the disk and semaphore arm with respect to each other and also relative to the front and rear walls of the casing.

Disk C is free to rotate on the bolt 29 in a clockwise direction within certain limits (as will hereafter appear) under the influence of the turn indicating cable 31. The outer end of the turn indicating cable 31 is secured to the rim of the disk C as at 32 and a portion of this cable passes around the rim of the disk seated in the groove 33 and out of the neck 23 of the casing. When the disk is turned by the movement of cable 31 the movement is against the tension of a coiled spring 34 and this spring 34 returns the disk to the position at rest when the turn indicating cable 31 is released. One end of the coil spring 34 is secured to the rim of the casing as at 35 and the other end is secured to a screw 36' in the forward face of the disk. For limiting the clockwise movement of the disk C there is a pin 36 in the forward face of the disk which lies in the path of an abutment block 37 carried on the inside of the forward wall 20 of the casing B. The pin 36 engages the block 37 when the disk is at the position indicating a right turn.

For the purpose of illuminating the semaphore arm (as will hereafter appear) there is a contact frame anchored in a segment of the disk. The frame is formed of copper wire of a diameter to be sufficiently rigid for the purpose intended. The ends 37a of this frame extend through openings in bushings 38 and these bushings are anchored in the disk. One side 39 of the frame projects rearwardly of the rear face of the disk while the other side 40 of the frame projects from the forward face of disk C and both sides 39, 40 are arcuate and of such a length as to transfer electricity from the electrical conductor to be described to the semaphore arm during the movement of the semaphore arm in either right or left turn positions or any of the three stop indicating positions.

For energizing the contact frame I run an insulated electrical conductor wire 42 through the neck 23 of the casing and within the casing this wire is secured by clamps 43 to the forward wall 20. On the free end of the wire is a metal terminal 44 which forms a wiping engagement with the forward side 40 of the contact frame. Normally this terminal 44 is spaced from the contact frame as indicated in Figure 4 of the drawings when the parts of the signal are in the rest position, but when the disk is moved terminal 44 wipes side 40 and transfers electrical energy to the contact frame.

In Figure 13 a preferred circuit for energizing the lead 42 is shown and in which 126 is the battery of the usual automobile ignition system grounded, as at 125, and connected to one side of the usual ammeter 127. A lead 128 extends from the other side of the ammeter 127 to one side of a suitably located switch 129 for breaking the circuit at will. A lead 113 connects the other side of the switch 129 to one terminal of a high tension, or other coil, 131 suitable for stepping up the voltage to neon tube capacity. The coil 131 is grounded, as at 133, and the lead 42 is extended from another terminal of said coil to the terminal 44 which as previously described wipingly engages the rearward side 40 of the described control frame.

The inner portion of the semaphore arm D is pivoted on the bolt 29 spaced rearwardly from the rear face of the disk C by one of the thimbles 30 and this arm extends through the slot 22 and projects outwardly of the casing so as to be in view of traffic. The movement of the semaphore arm D is limited by the pegs 45 secured to the rear face of the disk C. These pegs 45 are spaced so as to abut against the inner end of the semaphore arm and limit its movement to less than a quadrant of a circle. The projecting end of the arm D is formed to simulate the configuration of a human arm and hand as at 46. Around the perimeter of the extended portion is secured a neon tube 47 which also simulates the configuration of the arm and hand. The neon tube 47 may be of any desired color when illuminated such as red, green or blue. One terminal 48 of the neon tube is formed with a metal extension which has a wiping engagement with the periphery of the disk while the other terminal of the neon tube has a ring extension 49 which slides on side 39 of the contact frame. It will thus be seen that when the disk turns electricity is supplied to the contact frame, then to the neon tube and completes the circuit through the metal disk C to the ground connection 50 leading from the casing.

A stop control cable 51 extends through the neck 23 into the drum casing under the pivot bolt 29 and is connected on its inner end to a pin 52 carried by the semaphore arm outwardly of its pivot and when cable 51 is moved semaphore arm D is moved within its limits in a counter clockwise direction against the tension of a coil spring 53. One end of coil spring 53 is secured to a screw 54 carried by the disk C and the other end is attached to a pin 55a on the forward face of the semaphore arm. It will thus be seen that the tension of spring 53 being in a clockwise direction maintains the inner end of the arm against the peg 45. When cable 51 is pulled the semaphore arm moves in a counter clockwise direction until it abuts the other peg 45.

To operate the cables 31 and 51 I provide a control mechanism on the interior of the automobile for easy and efficient operation by the driver of the car. On the upper portion of steering post 15 there is mounted a segmental detent bracket 57 formed with notches or serrations on the upper edge thereof and this bracket has a band 57a at the center having extension ears bolted together at 57b about the post thereby holding the bracket in place. Around the bottom of the post 15 is clamped a band 56a carrying on its opposite periphery apertured bearing lugs 56. On the right hand side of the steering post is the right turn control rod 55 and on the left hand side is the left hand control rod 58.

The lower portions of control rods 55, 58 are journalled for rotation in the bearing lugs 56 while the upper portions thereof are journalled through apertures on the band 57a. There are lateral handles 59 on the upper ends of the control rods 55 and 58 that have wiping engagement with the serrated edges of the segmental bracket 57. Spaced screws 57c on the bracket 57 form limit stops in the path of the handles 59. The lower ends of control rods 55 and 58 have lateral extensions 60, at angles with respect to the control rods and the lengths of which are fashioned to provide a sweep that moves the cables predetermined distances to raise the semaphore arm in predetermined arcs, and since the right turn control rod 55 has to raise the arm to the highest point as shown in Figure 11 the extension 60 on this rod 55 is the longest.

The angular extensions 60 have eyes 61 on their ends to which are connected branch cables 62, 63. These branches merge at a point 64 with branch 65 which in turn joins with cable 31. The position of the extensions 60 and lengths of the branches 62, 63 and 65 moves the semaphore arm to right turn or left turn positions as indicated in Figures 11 and 12 by moving either one or the other of the handles 59 from their uppermost positions as shown in Figure 2 in a downward direction to a position in abutment with the stop screws 57c, and movement of the handles reversely to that described, allows the semaphore to move from the right or left turn position selected under the influence of spring 34 to the rest position indicated by dotted lines in Figure 10. The movement of either right or left hand control handle 59 will cause turn indicating cable 31 to move inwardly against spring tension on the down sweep of either handle from the position shown in Figure 2, and the return of the handles creates slack in the cable 31 which is made taut by the spring 34 returning the semaphore to rest position.

Secured to and extending below the panel 18 is a bracket 66 to the lower end of which is pivoted the center of a drag link 67. To one end of the drag link is connected the inner end of the semaphore operating cable 51. Drag link 67 is connected to the upper end of a section of cable 68 leading from the foot pedal 17 and this section passes over a pulley 69 above the drag link 67. So that the cables 31 and 51 will have a free movement on the panel 18 there are provided pulleys 70 to train these cables in the proper direction toward neck 23 of the signal casing B as will clearly appear in Figure 2 of the drawings.

Above the foot pedal 17 there is secured a U-shaped bracket 71 the legs of which are secured to the floor board 14 as at 72. In the crown 73 of the bracket are a pair of openings through which the inner end of cable 31 and the inner end of section 68 extends. Coil springs 74, 75 of equal tension respectively connect the inner end of cable 31 with the foot pedal and the inner end of section 68 with the foot pedal. The coil springs 74 and 75 on the ends of the cable permit the full movement of their cables regardless of the sweep of the foot brake 17 inasmuch as the sweep of the foot brake varies as the brakes require adjustment. On section 68 of cable 51 and on cable 31 are balls 76 which limit the downward stroke of these cables when they abut the crown 73 of the bracket.

Movement of right hand lever 55 will move turn indicating cable 31 inwardly and this movement will cause disk C to move from the position at rest shown in Figures 2, 3 and 4 to the position shown in Figures 5 and 11. Movement of left hand lever 58 moves cable 31 only to such distance that disk C turns only to a point where the semaphore is in left turn position indicated in Figure 12. Now in event it is the desire of the driver to stop while making the turn an application of the foot brake 17 swings drag link 67 and moves cable 51 inwardly.

This movement of foot brake 17 causes the semaphore to move counter-clockwise to a stop position from either right or left turn position indicated in Figures 11 and 12, to the dotted line stop positions in these figures. It will be seen that there is a separate position of the semaphore to indicate the stop from the right turn initiated as in Figure 11 and another position for a stop from the left turn initiated as in Figure 12. The movement of cable 51 inwardly swings the semaphore counter-clockwise within the limits of the pegs 45 against the action of the coil spring 53.

If after having slowed down to make the turn, should the driver continue with the turn initiated, the release of the foot brake 17 releases cable 51 permitting spring 53 to pull semaphore arm in a clockwise direction from stop position indicated in the dotted lines in Figures 11 and 12 to the full line position indicated in the same figures thereby indicating an intention to execute the turn to the right or left as seen by the position of the semaphore.

When foot brake 17 is applied, cable 31 moves the disk C carrying the semaphore arm from the rest position to the stop position indicated in Figure 10 because the length of cable 31 has been selected and arranged to give the necessary swing under these conditions. The same movement of pedal 17 will also cause a pull on section 68 of cable 51, but the arrangement of the drag link 67 permits just enough slack in cable 51 to compensate for the movement of cable 31 without moving the semaphore arm in a counter-clockwise direction against the action of spring 53. That is to say, to make the semaphore arm indicate a regular stop position where no turn has been initiated, the pressing of pedal 17 allows cable 31 to move and at the same time creates an equal amount of slack in cable 51 to compensate and equalize the pull so there will be no back pressure on cable 51 that might disturb the semaphore arm after it has been moved to the regular stop position in Figure 10.

It only requires slight movement of the disk C in a clockwise direction for terminal 44 to engage the contact frame and energize the neon tube 47, but when the semaphore and disk are in the position shown in Figure 4 of the drawings, that is the pendant or at rest position, there will be no current passing to the neon tube because terminal 44 is spaced from the adjacent end 37a of the contact frame.

Having thus described the invention, what is claimed as new is:

1. In a signalling mechanism for automobiles including a steering post and a brake pedal, an actuating disk rotatably mounted on the automobile for limited movement from normal position, spring means tensioning said disk against such movement, a signal arm mounted on the disk to be swung by such movement of the latter into right and left turn indicating positions, respectively, and also into stop indicating position, said arm being independently swingable on said disk for movement from right and left turn indicating positions to stop indicating position, spring means tensioning said arm against such independent movement, means for operating said disk including a pair of right and left turn levers mounted on said steering post, a main cable connected at one end to said disk and provided with branches connected to said levers and pedal, respectively, whereby operation of said levers effects swinging of said arm into right and left turn indicating positions, respectively, and operation of said brake pedal effects swinging of said arm into stop indicating position, means to independently swing said arm to stop indicating position from said right and left turn indicating positions and comprising an auxiliary cable operatively connecting said brake pedal to said arm, and means in the line of connection of the auxiliary cable to compensate for operation of said disk by the brake pedal and main cable.

2. In a signalling mechanism for automobiles including a steering post and a brake pedal, an actuating disk rotatably mounted on the automobile for limited movement from normal position, spring means tensioning said disk against such movement, a signal arm mounted on the disk to be swung by such movement of the latter into right and left turn indicating positions, respectively, and also into stop indicating position, said arm being independently swingable on said disk for movement from right and left turn indicating positions to stop indicating position, spring means tensioning said arm against such independent movement, means for operating said disk including a pair of right and left turn levers mounted on said steering post, a main cable connected at one end to said disk and provided with branches connected to said levers and pedal, respectively, whereby operation of said levers effects swinging of said arm into right and left turn indicating positions, respectively, and operation of said brake pedal effects swinging of said arm into stop indicating position, means to independently swing said arm to stop indicating position from said right and left turn indicating positions and comprising an auxiliary cable operatively connecting said brake pedal to said arm, and means in the line of connection of the auxiliary cable to compensate for operation of said disk by the brake pedal and main cable, and including a drag link pivoted intermediate the ends thereof on a fixed part of the automobile and having one end of the auxiliary cable connected to one end thereof, and a cable connection between the other end of the drag link and the brake pedal.

3. In a signalling mechanism for automobiles including a steering post and a brake pedal, an actuating disk rotatably mounted on the automobile for limited movement from normal position, spring means tensioning said disk against such movement, a signal arm mounted on the disk to be swung by such movement of the latter into right and left turn indicating positions, respectively, and also into stop indicating position, said arm being independently swingable on said disk for movement from right and left turn indicating positions to stop indicating position, spring means tensioning said arm against such independent movement, means for operating said disk to effect swinging movement of said arm into right and left turn and stop indicating positions, respectively, and including a pair of right and left turn levers mounted on said steering post and operatively connected to said disk, respectively, and an operating connection between the brake pedal and said disk, and means for independently swinging said arm to stop indicating position from either right or left turn indicating positions and including an operating connection between said arm and brake pedal.

ALBERT LEONG CHANG.